United States Patent
Hackenberg et al.

[11] 3,812,511
[45] May 21, 1974

[54] PHOTOGRAPHIC APPARATUS

[75] Inventors: Hubert Hackenberg; Siegfried Zobel, both of Munich, Germany

[73] Assignee: Afga-Gevaert Aktiengesellschaft, Leverkusen, Germany

[22] Filed: Aug. 23, 1972

[21] Appl. No.: 283,234

[30] Foreign Application Priority Data
Aug. 24, 1971 Germany............................ 2142327

[52] U.S. Cl. .............................. 354/258, 95/53 EB
[51] Int. Cl. ............................................. G03b 9/08
[58] Field of Search............. 95/10 CT, 53 E, 53 EB

[56] References Cited
UNITED STATES PATENTS

| | | | |
|---|---|---|---|
| 3,709,135 | 1/1973 | Simon et al...................... | 95/10 CT |
| 3,581,633 | 6/1971 | Uno et al.......................... | 95/10 CT |
| 3,636,850 | 1/1972 | Kikuchi et al. .................. | 95/10 CT |
| 3,715,959 | 2/1973 | Harvey.............................. | 95/53 EB |
| 3,698,299 | 10/1972 | Arisaka et al. .................. | 95/10 CT |
| 3,701,310 | 10/1972 | Dietz................................. | 95/53 E |

Primary Examiner—Samuel S. Matthews
Assistant Examiner—Russell E. Adams, Jr.
Attorney, Agent, or Firm—Michael S. Striker

[57] ABSTRACT

A photographic apparatus wherein the depression of a release button results in closing of a switch which connects an electrical exposure control with a source of electrical energy. The switch remains closed subsequent to termination of pressure against the release button because the contacts of the switch are urged against each other by a spring-biased blocking pawl as soon as the latter is disengaged from a cocked shutter-actuating lever in response to depression of the release button.

16 Claims, 7 Drawing Figures

PHOTOGRAPHIC APPARATUS

BACKGROUND OF THE INVENTION

The present invention relates to photographic apparatus in general, especially to still cameras, and more particularly to improvements in photographic apparatus wherein an electrical or electronic exposure control system is connected with a source of electrical energy in response to actuation of the camera release.

It is already known to provide a photographic camera with an electrical or electronic exposure control system which is connected with a source of electrical energy in response to depression of the camera release button. As a rule, such cameras comprise two electric switches, namely, a first switch which is closed in response to depression of the release button and a second switch which is connected in parallel with the first switch and is closed by an electromagnet in response to actuation of the shutter. Such arrangement of switches renders it possible to terminate the pressure upon the release button practically immediately after initial actuation. Thus, the first switch can be opened immediately after closing thereof but the second switch remains closed as long as necessary to complete a relatively short or a relatively long exposure. A drawback of the just discussed proposal is that the camera must be equipped with two electric switches and hence with a substantial number of electric contacts. This increases the likelihood of contamination of switch contacts and eventual malfunctioning of the photographic apparatus.

SUMMARY OF THE INVENTION

An object of the invention is to provide a photographic apparatus wherein a single electric switch is sufficient to insure completion of the circuit of an electric or electronic exposure control system in response to short-lasting actuation of the release button and wherein such single switch insures that the circuit of the exposure control system remains completed as long as necessary to terminate the exposure with a manually or automatically selected exposure time.

Another object of the invention is to provide a photographic apparatus with novel and improved means for completing the circuit of the exposure control system independently of the duration of depression of the camera release button.

A further object of the invention is to provide a novel and improved operative connection between the camera release means, the exposure control system and the shutter actuating means in a photographic apparatus.

An additional object of the invention is to provide novel and improved release means for use in photographic apparatus of the above outlined characteristics.

The improved photographic apparatus comprises current-utilizing exposure control means, a battery or another suitable source of electrical energy, normally open single electric switch means connected between the exposure control means and the energy source and having normally separated first and second switch contacts, release means which is movable from an idle position to an operative position (for example, in response to the application of finger pressure against a button or pin of the release means) and having closing means arranged to effect an engagement between the first and second contacts of the single electric switch in response to movement of the release means to its operative position, and novel means for maintaining the contacts of the single electric switch in engagement with each other subsequent to movement of the release means to the operative position and irrespective of further position of the release means. The means for maintaining the contacts in engagement comprises a shutter actuating device which is movable between a starting position and a shutter-actuating second position, a blocking device which normally engages with the shutter actuating device to hold the latter in the starting position and cooperates with one of the switch contacts to become disengaged from the shutter actuating device in response to establishment of current-conducting engagement between the contacts by way of the closing means, and biasing means for urging the contacts against each other by way of the blocking means upon disengagement of the blocking means from the switch actuating means.

The biasing means preferably comprises at least one resilient element which is arranged to urge the contacts of the single switch against each other with a predetermined force. The closing means is preferably arranged to move the first contact against the second contact in response to movement of the release means to its operative position, and the biasing means is preferably arranged to urge the second switch contact against the first switch contact by way of the blocking device in the second position of the shutter actuating device.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
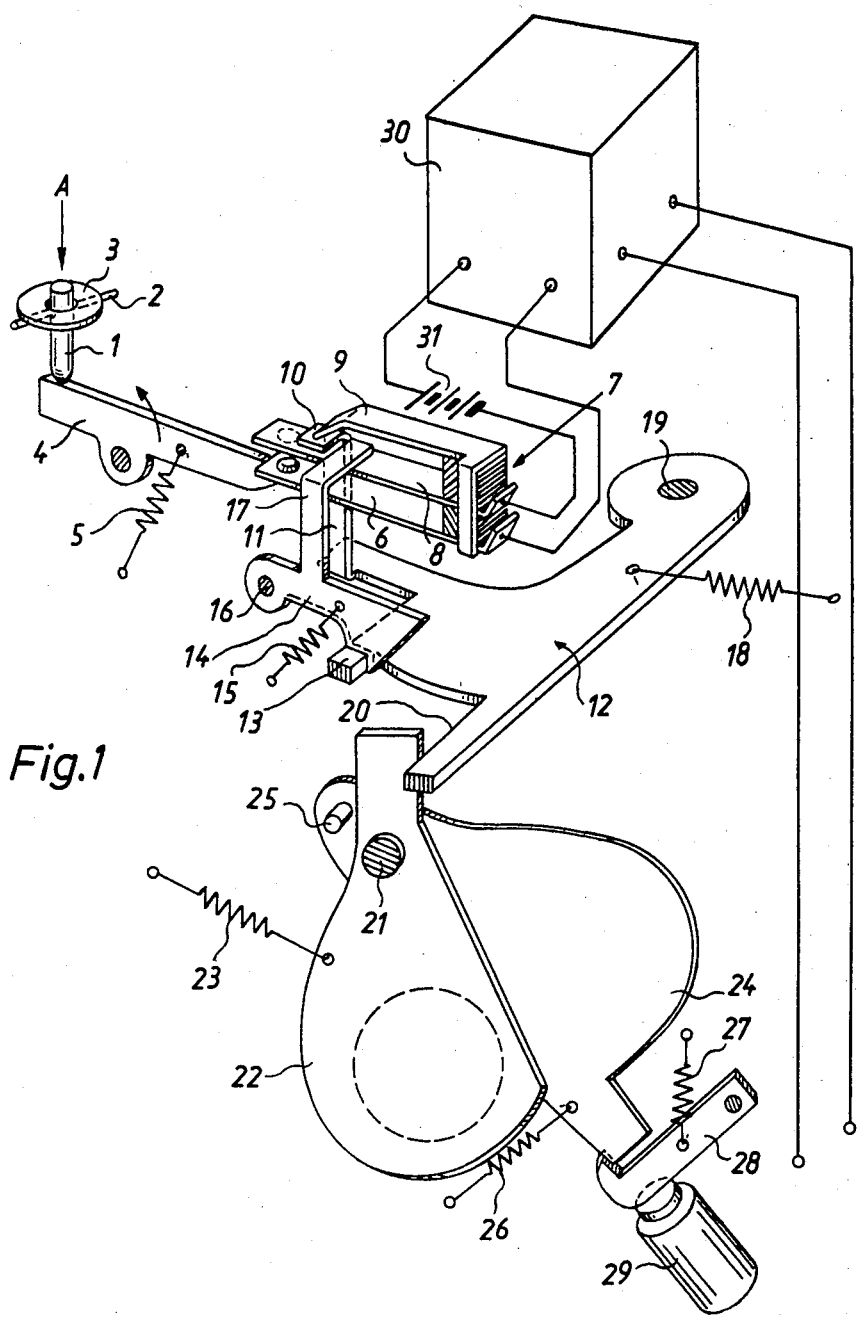
FIG. 1 is an enlarged fragmentary perspective view of a still camera which embodies one form of the invention.

Referring first to FIG. 1, there is shown a portion of a still camera which comprises release means including a reciprocable release pin 1 having a diametrically extending stop post 2 which normally abuts against the underside of a washer 3 forming part of or being secured to the body of the photographic camera. The release means further comprises a two-armed switch closing lever 4 and a helical spring 5 which is anchored in the body of the camera and tends to pivot the closing lever 4 in a clockwise direction, as viewed in FIG. 1. The left-hand arm of the lever 4 abuts against the lower end portion of the release pin 1 and, when allowed to contract, the spring 5 maintains the post 2 in abutment with the underside of the washer 3. The arrow A indicates the direction in which the release pin 1 is to be depressed in order to move the release means from the illustrated idle position to an operative position. When the release means 1-5 assumes the idle position of FIG. 1, the right-hand arm of the switch closing lever 4 is located at a level below a first elastic contact 6 forming part of an electric switch 7 which is connected between a battery or an analogous source 31 of electric energy and an electronic exposure control system 30 of conventional design. The switch 7 further comprises a second or median elastic contact 8 which is normally separated from the first contact 6. Thus, prior to the making of an exposure (when the release means 1-5 dwells in the illustrated idle position), the circuit of the electronic exposure control system 30 is open because the completion of such circuit necessitates an engagement between the switch contacts 6 and 8. The switch 7 further comprises a third elastic contact 9 which is prestressed so that it normally tends to pivot its left-hand end portion in a downward direction, as viewed in FIG. 1, and to thus move the median contact 8 against the lower contact 6. The third contact 9 is electrically connected with the first contact 6, and it can be said that the contact 9 constitutes a portion or extension of the first contact 6.

The means for maintaining the switch 7 in closed position subsequent to initial closing by way of the release means 1-5 (irrespective of the position of release means after the release means has been actuated even for a very short period of time) comprises a shutter actuating member 12 which is a lever turnable about the axis of a vertical pivot pin 19 mounted in the body of the photographic apparatus. The shutter actuating member 12 is biased in a counterclockwise direction, as viewed in FIG. 1, by a helical spring 18 which is anchored in the body of the photographic apparatus. FIG. 1 shows the shutter actuating member 12 in a starting position in which the member 12 is held by the pallet 14a of a blocking pawl 14. The pawl 14 constitutes a two-armed lever one arm of which carries the pallet 14a and the other arm of which is a substantially L-shaped body 17 serving as connecting means and having a horizontal upper portion which overlies the elastic contact 8 of the switch 7. The pallet 14a normally engages a projection or tooth 13 of the shutter actuating member 12. The member 12 further comprises a projection or bracket 11 having a bent-over upper end portion or lug 10 which is disposed between the tip of the third switch contact 9 and the adjacent portion of the median switch contact 8. Thus, when the shutter actuating member 12 dwells in the illustrated starting position, the lug 10 of its bracket 11 prevents the springy contact 9 of the switch 7 from moving downwardly and from pressing the median contact 8 against the lower contact 6. The blocking pawl 14 is pivotable in the body of the photographic apparatus about a horizontal pivot pin 16. A resilient element, here shown as a helical spring 15, is provided to permanently bias the blocking pawl 14 in a clockwise direction, as viwd in FIG. 1, so as to maintain the pallet 14a in engagement with the projection 13 of the shutter actuating member 12 and to urge the L-shaped portion 17 in a direction to pivot clockwise. A further projection or arm 20 of the shutter actuating member 12 is located in the path of movement of an extension 22a of a first or leading shutter blade 22 which is pivotable on a horizontal pin 21 of the camera body and is biased in a clockwise direction, as viewed in FIG. 1, by a helical spring 23. When the shutter actuating member 12 dwells in the illustrated starting position, its arm 20 holds the leading shutter blade 22 in a closing position in which the blade 22 overlies a light-admitting opening 22A located in front of the foremost unexposed film frame. The shutter further comprises a second or trailing blade 24 which is also pivotable on the pin 21 and normally dwells in the illustrated open position in which it does not overlie the light-admitting opening 22A. The trailing shutter blade 24 is biased to its closed position by a helical spring 26 and its uppermost portion comprises a motion receiving stud 25 which is located in the path of movement of the extension 22a of the leading shutter blade 22. A downwardly projecting extension 24a of the trailing shutter blade 24 is normally engaged by a locking pawl 28 which constitutes the armature of an electromagnet 29. The pawl 28 is biased in a clockwise direction by a helical spring 27 so that it normally tends to engage and hold the extension 24a of the trailing shutter blade 24. The electromagnet 29 is controlled by the electronic exposure control system 30 so that it is energized and disengages the pawl 28 from the extension 24a with a predetermined delay following the closing of switch 7. This completes the making of an exposure because the spring 26 is then free to pivot the trailing shutter blade 24 in a clockwise direction, as viewed in FIG. 1, so that the blade 24 overlies the light-admitting opening 22A and terminates the admission of scene light against the foremost unexposed film frame.

When the making of an exposure is completed, the operator actuates the customary film transporting mechanism (not shown) to thereby return the shutter actuating member 12 from its shutter actuating position (FIG. 2b) back to the illustrated starting position whereby the projection 13 slides along an inclined cam face 14b of the pallet 14a and is reengaged by the pallet as soon as it reassumes the illustrated starting position. Such movement of the shutter actuating member 12 results in a return movement of shutter blades 22 and 24 to the illustrated positions because the arm 20 of the member 12 pivots the leading shutter blade 22 against the opposition of the spring 23 so that the blade 22 again overlies the light-admitting opening 22A. At the same time, the extension 22a of the leading shutter blade 22 engages the motion receiving stud 25 and pivots the trailing shutter blade 24 back to the position in which the extension 24a can be reengaged by the locking pawl 28. The camera is then ready for the making of the next exposure.

The operation is as follows.

Figure 2A:
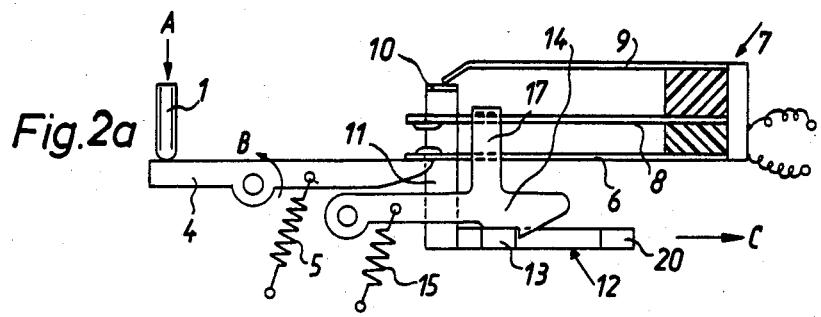
FIG. 2a is a side elevational view of a detail in the structure of FIG. 1, showing the single electric switch in its open position.

The initial or idle position of the pin 1 of release means 1-5 is illustrated in FIG. 2a. If the user of the photographic apparatus wishes to make an exposure, finger pressure is applied in the direction indicated by the arrow A whereby the stop post 2 moves away from the underside of the washer 3 and the pin 1 pivots the closing lever 4 in a counterclockwise direction as indicated in FIG. 2a by an arrow B. This results in a stressing of the helical spring 5. At the same time, the right-hand arm of the lever 4 moves the elastic contact 6 of the switch 7 upwardly so that the contact 6 engages the contact 8 and thus connects the source 31 of electrical energy with the electronic exposure control system 30. This system is then ready to energize the electromagnet 29 with a delay which is a function of prevailing scene brightness. The exposure control system 30 may further serve to select a diaphragm aperture which is appropriate for the prevailing scene brightness.

After the lever 4 of the release means 1-5 closes the switch 7 to connect the energy source 31 with the electronic exposure control system 30, the lever 4 continues to pivot in a counterclockwise direction, as viewed in FIG. 2a, whereby the lower contact 6 pivots the median contact 8 so that the latter engages the horizontal top part of the L-shaped portion 17 of the blocking pawl 14. Consequently, the pawl 14 pivots in a counterclockwise direction, as viewed in FIG. 2a, and stresses the spring 15. The pallet 14a moves above and away from the projection 13 of the shutter actuating member 12 so that the latter is free to follow the bias of the spring 18 and to move from the illustrated starting position to the shutter actuating position of FIG. 2b. Such movement results in a movement of the arm 20 away from the extension 22a of the leading shutter blade 22 whereby the latter pivots under the action of the helical spring 23 and admits scene light against the foremost unexposed film frame by way of the opening 22A. The trailing shutter blade 24 remains in the position shown in FIG. 1 as long as the electromagnet 29 remains deenergized, i.e., as long as the spring 27 is free to maintain the pallet of the locking pawl 28 in engagement with the extension 24a of the trailing shutter blade 24.

As soon as the shutter actuating member 12 is free to follow the bias of the spring 18, its bracket 11 and lug 10 move away from the path of the springy contact 9, so that the latter is free to pivot in a counterclockwise direction, as viewed in FIG. 2a, and to bear against the median contact 8. This results in uninterrupted engagement between the contacts 6 and 8 and insures the completion of the circuit of electronic exposure control system 30 irrespective of the position of closing lever 4. Thus, the user of the photographic apparatus can terminate the finger pressure against the pin 1 as soon as the blocking pawl 14 is disengaged from the projection 13 of the shutter actuating member 12 because the member 12 then allows the contact 9 to press the median contact 8 against the lower contact 6. When the lug 10 is moved away from the path of the contact 9, the switch 7 is closed in two different ways, namely, the contact 9 bears against the contact 8 and thus closes the switch 7 because the contact 9 is connected with the contact 6. At the same time, the contact 9 urges the contact 8 against the contact 6 so that the switch 7 is closed directly by way of the contacts 6 and 8.

Figure 2B:
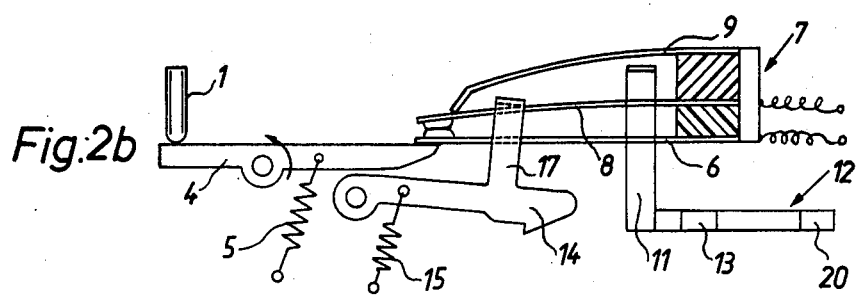
FIG. 2b is a similar side elevational view but showing the switch in its closed position subsequent to return movement of the release means to its idle position.

If the user of the camera terminates finger pressure in the direction indicated by arrow A before the trailing shutter blade 24 is disengaged from the locking pawl 28, the spring 5 is free to contract and pivots the closing lever 4 counter to the direction indicated by the arrow B. The left-hand arm of the closing lever 4 comes to a halt when the stop post 2 of the release pin 1 engages the underside of the stationary washer 3. Such position of the release means 1-5 is shown in FIG. 2b. The contact 8 is biased against the contact 6 by the upper contact 9. As mentioned before, all parts of the structure shown in FIG. 1 can return to the illustrated positions in response to actuation of the film transporting mechanism which causes the shutter actuating member 12 to reassume the starting position of FIGS. 1 and 2a and to be reengaged and held by the blocking pawl 14. It will be noted that, when the shutter actuating member 12 dwells in the shutter actuating position shown in FIG. 2b, the spring 15 is free to bias the blocking pawl 14 in a clockwise direction whereby the L-shaped portion 17 of the blocking pawl urges the median contact 8 against the lower contact 6. Consequently, the switch 7 remains closed not only because the uppermost contact 9 is prestressed but also because the contact 8 is positively pressed against the contact 6 by the portion 17 of the blocking pawl 14 as long as the pawl 14 remains disengaged from the shutter actuating member 12. The pawl 14 is arrested in the position shown in FIG. 2b as soon as the stop 2 of the release pin 1 engages the underside of the washer 3. This insures that the cam face 14b of the pallet 14a remains in the path of movement of the projection 13 when the shutter actuating member 12 is pivoted back to the starting position of FIG. 1. Consequently, the member 12 is automatically reengaged by the pallet 14a as soon as its arm 20 returns the leading shutter blade 22 to the illustrated closing position. The bias of the spring 15 is preferably selected in such a way that it urges the contact 8 against the contact 6 (see FIG. 2b) with a predetermined force which is sufficient to insure that the contact 8 cannot become separated from the contact 6 in the course of normal manipulation of the camera.

The contacts 6 and 8 of the switch 7 constitute a mechanical motion transmitting connection between the release means 1-5 and the blocking pawl 14 for the shutter actuating member 12. Thus, when the release pin 1 is depressed in the direction indicated by arrow A, the lever 4 closes the switch 7 by pressing the contact 6 against the contact 8 and, as the lever 4 continues to pivot in the direction indicated in FIG. 2a by the arrow B, it causes the contact 8 to lift the pallet 14a above and away from the projection 13 of the shutter actuating member 12 so that the latter is free to follow the bias of the spring 18 and to assume the position shown in FIG. 2b. It will be noted that the closing lever 4 of the release means cooperates with the springy contact 6 and that the blocking pawl 14 cooperates with the springy contact 8 of the switch 7. During the initial stage of depression of the release pin 1, the contact 6 moves upwardly relative to the contact 8; however, once the contact 6 engages the contact 8 and the closing lever 4 continues to pivot in the direction indicated by the arrow B, the contacts 6 and 8 move together in the same direction (namely, clockwise, as viewed in FIG. 2b) to thereby effect a disengagement of the blocking pawl 14 from the shutter actuating member 12. As soon as the pallet 14a is disengaged from the projection 13 of the shutter actuating member 12, the spring 15 is free to contract and to move the contacts 6 and 8 downwardly, as viewed in FIGS. 2a or 2b, while the contact 8 remains in engagement with the contact 6 because the latter abuts against the right-hand arm of the closing lever 4. The spring 15 is free to cooperate with the spring 5 and to return the release pin 1 to the idle position shown in FIG. 1 as soon as the operator has terminated the application of finger pressure against the exposed portion of the pin 1 (see the arrow A in FIGS. 1 or 2a). The spring 15 insures that the length of the interval during which the switch 7 remains closed is independent of the position of component parts of the release means 1-5 once the release means has been caused to assume its operative position. The switch 7 opens again when the shutter actuating member 12 reassumes the starting position of FIG 1a. At such time, the lug 10 of the bracket 11 lifts the prestressed contact 9 above and away from the median contact 8. Also the L-shaped portion 17 of the blocking pawl 14 allows the median contact 8 to move away from the lower contact 6.

Figure 3A:
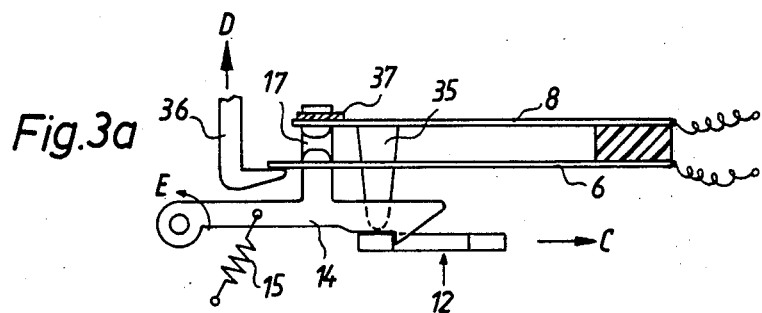
FIG. 3a is a side elevational view of a portion of a slightly modified camera with the single electric switch shown in its open position.
Figure 3B:
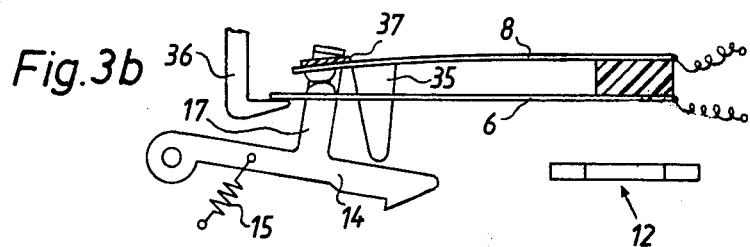
FIG. 3b is a similar side elevational view but showing the switch of FIG. 3a in closed position subsequent to return movement of the release means to its idle position.

FIGS. 3a and 3b illustrate a portion of a second photographic apparatus wherein all such parts which are identical with or clearly analogous to the corresponding parts of the apparatus shown in FIGS. 1, 2a and 2b are denoted by similar reference characters. The apparatus of FIGS. 3a and 3b comprises a distancing element 35 which is secured to the contact 8 of the switch 7' and normally abuts against the upper side of the shutter actuating member 12 when the latter assumes the starting position shown in FIG. 3a. This insures that the contact 8 is separated from the contact 6. The apparatus of FIGS. 3a and 3b further comprises an insulator 37 which is interposed between the L-shaped portion 17 of the blocking pawl 14 and the upper side of the contact 8. The contact 9 has been omitted entirely. Furthermore, the closing lever 4 of FIG. 1 has been replaced with a closing member 36 which moves upwardly (see the arrow D) when the release pin 1 (not shown in FIGS. 3a and 3b) is depressed in the direction indicated in FIG. 1 by arrow A. When the user wishes to make an exposure, the release pin 1 is depressed whereby the closing member 36 moves upwardly (see the arrow D). A horizontal projection or tooth 36a of the closing member 36 lifts the elastic contact 6 so that the contact 6 moves into engagement with the contact 8 whereby the switch 7' connects the energy source 31 with the electronic exposure control system 30. As the closing member 36 continues to move in the direction indicated by the arrow D, the contact 8 causes the insulator 37 to lift the L-shaped portion 17 of the blocking pawl 14 whereby the pallet 14a is disengaged from the projection 13 of the shutter actuating member 12 and the latter is free to pivot in the direction indicated by the arrow C to assume the shutter actuating position shown in FIG. 3b. The operator can immediately terminate the finger pressure upon the release pin 1 because the spring 15 is free to contract and pivots the blocking pawl 14 in a clockwise direction to the position shown in FIG. 3b whereby the L-shaped portion 17 causes the upper contact 8 to bear against the lower contact 6 and to maintain the switch 7' in closed position. The distancing element 35 is free to descend with the contact 8 as soon as the pallet 14a is disengaged from the shutter actuating member 12 because the member 12 then assumes the position shown in FIG. 3b and is located out of the path of downward movement of the distancing member 35. The lower portion of the distancing member 35 is preferably rounded so that it can be engaged and lifted by the shutter actuating member 12 when the member 12 is caused by the film transporting mechanism to reassume the starting position of FIG. 3a and to be reengaged by the pallet 14a of the blocking pawl 14. The springy contact 8 of FIGS. 3a and 3b exhibits a tendency to pivot its left-hand end portion downwardly into engagement with the adjacent portion of the elastic contact 6. The arrow E indicates in FIG. 3a the direction in which the blocking pawl 14 is pivoted in response to upward movement of the contact 8 under the action of the closing member 36. The prestressed contact 8 assists the spring 15 in maintaining the contacts 6 and 8 in engagement with each other as soon as the pallet 14a is disengaged from the shutter actuating member 12 and the member 12 allows the distancing element 35 to descent. It will be noted that the springy contact 8 is located behind the contact 6, as considered in the direction of arrow D, i.e., as considered in the direction of movement of closing member 36 from its idle position to its oprative position. This also applies for the structure shown in FIGS. 1, 2a and 2b. The third contact 9 can be omitted in the switch 7' of FIGS. 3a and 3b because the contact 8 is mounted in prestressed condition so that it tends to move toward the contact 6. Such prestressing of the contact 8 brings about the same advantage as the provision of third contact 9 shown in FIG. 1, namely, the switch 7' is unlikely to open in response to shaking or similar movements of the photographic apparatus after the release means is allowed to return to its idle position.

Figure 4A:
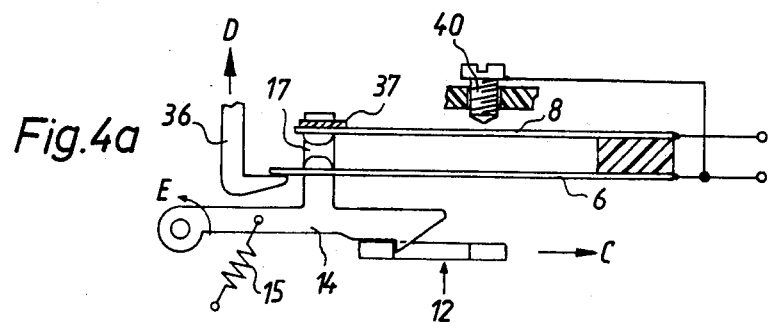
FIG. 4a is a side elevational view of a portion of a third photographic apparatus with the single electric switch shown in its open position.
Figure 4B:
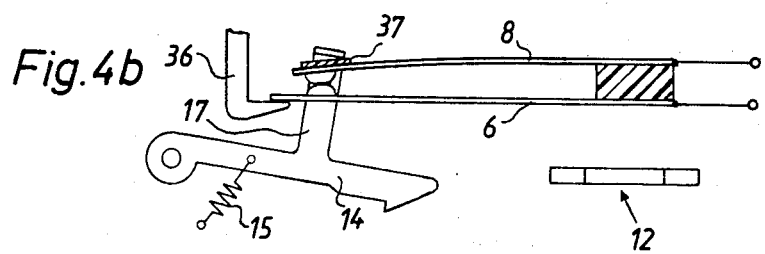
FIG. 4b illustrates the structure of FIG. 4a but with the switch in closed position.

Referring finally to FIGS. 4a and 4b, there is shown a portion of a third photographic apparatus wherein the electric switch 7" comprises a first elastic contact 6, a second elastic contact 8 which is mounted in prestressed condition so that it tends to move upwardly, as viewed in FIGS. 4a and 4b, and a third contact here shown as a threaded member or screw 40 consisting of current-conducting material and being electrically connected with the contact 6. All other parts of the apparatus shown in FIGS. 4a and 4b are identical with those shown in FIGS. 3a and 3b with the exception that the distancing element 35 has been omitted. As mentioned above, the second contact 8 of the switch 7" shown in FIGS. 4a and 4b tends to move upwardly and to engage the threaded member 40, i.e., to be electrically connected with the contact 6.

When the operator moves the closing member 36 in the direction indicated by the arrow D, the portion 36a of the member 36 lifts the left-hand end portion of the contact 6 toward and into engagement with the contact 8 to thereby connect the exposure control system with the energy source. Further upward movement of the closing member 36 causes the contact 8 to lift the insulator 37 which in turn lifts the L-shaped portion 17 of the blocking pawl 14 so that the pallet 14a becomes disengaged from the projection 13 of the shutter actuating member 12 and the member 12 is free to pivot in the direction indicated by arrow C to assume the shutter actuating position shown in FIG. 4b. The spring 15 is thereupon free to contract and to pull the blocking pawl 14 in a clockwise direction toward the position shown in FIG. 4b whereby the L-shaped portion 17 causes the insulator 37 to maintain the contact 8 in engagement with the contact 6. The blocking pawl 14 is lifted back to the position shown in FIG. 4a as soon as the shutter actuating member 12 is returned from the position shown in FIG. 4b to the position of FIG. 4a. The axial position of the threaded current conducting member 40 is adjustable in a direction toward and away from the adjacent portion of the contact 8 of the switch 7''.

An important advantage of the improved photographic apparatus is that a single electric switch 7, 7' or 7'' is sufficient to insure continued completion of the circuit of the exposure control system 30 as long as the shutter remains open and irrespective of the position of the release pin 1. Consequently, the operator can terminate finger pressure against the pin 1 as soon as the blocking pawl 14 is disengaged from the shutter actuating member 12. The exact construction of the exposure control system 30 forms no part of the present invention. As mentioned before, this system is preferably designed to determine the delay with which the electromagnet 29 of FIG. 1 can effect a movement of the trailing shutter blade 24 to its closing position. Also, the exposure control system 30 can control the size of the aperture which is defined by the diaphragm (not shown) as a function of prevailing scene brightness.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a photographic apparatus, a combination comprising current-utilizing exposure control means; a source of electrical energy; electric switch means connected between said exposure control means and said energy source, said electric switch means movable between a normally open position and a closed position; release means movable between an idle position and an operative position; closing means for movement of said switch means from said normally open into said closed position thereof in response to movement of said release means from said idle position to said operative position; a shutter actuating device movable between a starting position and a shutter actuating position; a blocking device movable between a holding position engaging said shutter actuating device to hold the latter in said starting position thereof and a releasing position disengaged from said shutter actuating device so as to permit the same to move into said shutter actuating position thereof; connecting means arranged between said blocking device and said switch means for moving said blocking device from said holding position into said disengaged position thereof upon movement of said switch means into said closed position thereof; and biasing means for maintaining said switch means in said closed position thereof by way of said blocking device and said connecting means upon disengagement of said blocking device from said shutter actuating device.

2. A combination as defined in claim 1, wherein said switch means comprises first and second contacts which are separated in said open position of said switch means and are moved against each other upon closing of said switch means.

3. A combination as defined in claim 2, wherein said biasing means comprises at least one resilient element arranged to urge said contacts against each other with a predetermined force.

4. A combinatin as defined in claim 2, wherein said closing means is arranged to move said first contact against said second contact in response to movement of said release means to said operative position and wherein said biasing means is arranged to urge said second contact against said first contact by way of said blocking device and said actuating means in the second position of said shutter actuating device.

5. A combination as defined in claim 4, wherein said switch comprises a third contact electrically connected with said first contact and said shutter actuating device comprises means for holding said third contact out of engagement with said second contact in the starting position of said shutter actuating device.

6. A combination as defined in claim 5, wherein said third contact is prestressed to automatically engage said second contact in response to movement of said shutter actuating device from said starting position.

7. A combination as defined in claim 4, further comprising distancing means disposed between said shutter actuating device and said second contact to hold said second contact out of engagement with said first contact in the starting position of said shutter actuating device.

8. A combination as defined in claim 7, wherein said distancing means consists at least in part of insulating material and said second contact is elastic and is mounted in prestressed condition to automatically bear against said first contact on movement of said shutter actuating device from said starting position to thus assist the switch closing action of said biasing means.

9. A combination as defined in claim 4, wherein said switch means further comprises a third contact electrically connected with said first contact and located in the path of movement of said second contact in response to movement of said release means from said idle position to close said switch means upon engagement with said second contact.

10. A combination as defined in claim 9, wherein said second contact is elastic and exhibits the tendency to engage with said third contact.

11. A combination as defined in claim 10, wherein one of said second and third contacts is adjustable toward and away from the other of said second and third contacts.

12. A combination as defined in claim 4, further comprising insulator means interposed between said second contact and said blocking device.

13. A combination as defined in claim 1, wherein said blocking device is pivotable about a predetermined axis and comprises a pallet engaging said shutter actuating device in the starting position of said shutter actuating device.

14. A combination as defined in claim 13, wherein said blocking device is a lever having a plurality of arms, said pallet being provided on one arm of said lever and another arm of said lever being engaged and pivoted by said second contact in response to movement of said release means from said idle position.

15. A combination as defined in claim 1, wherein said biasing means comprises resilient means for returning said release means to said idle position.

16. A combination as defined in claim 1, further comprising a shutter having a blade movable to a light-admitting position in response to movement of said shutter actuating device from said starting position.

* * * * *